US009262717B2

(12) United States Patent
Endoh et al.

(10) Patent No.: US 9,262,717 B2
(45) Date of Patent: Feb. 16, 2016

(54) APPARATUS AND A METHOD FOR RETRIEVING AN OBJECT

(71) Applicants: Yusuke Endoh, Kanagawa-ken (JP); Hiromasa Shin, Kanagawa-ken (JP); Yoshiaki Hasegawa, Tokyo (JP)

(72) Inventors: Yusuke Endoh, Kanagawa-ken (JP); Hiromasa Shin, Kanagawa-ken (JP); Yoshiaki Hasegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 348 days.

(21) Appl. No.: 13/670,975

(22) Filed: Nov. 7, 2012

(65) Prior Publication Data

US 2013/0238541 A1    Sep. 12, 2013

(30) Foreign Application Priority Data

Mar. 12, 2012    (JP) ................................ 2012-054766

(51) Int. Cl.
*G06N 5/02* (2006.01)
*G06F 17/30* (2006.01)
*G06T 17/30* (2006.01)

(52) U.S. Cl.
CPC .......... *G06N 5/022* (2013.01); *G06F 17/30241* (2013.01); *G06T 17/30* (2013.01); *G06T 2210/21* (2013.01)

(58) Field of Classification Search
None
See application file for complete search history.

(56) References Cited

U.S. PATENT DOCUMENTS

| 6,694,283 | B2 * | 2/2004 | Alfano et al. | 702/150 |
| 7,030,875 | B2 * | 4/2006 | Gupta et al. | 345/419 |
| 2009/0094010 | A1 | 4/2009 | Kothuri et al. | |

FOREIGN PATENT DOCUMENTS

| JP | 3-75885 A | 3/1991 |
| JP | 3-131977 A | 6/1991 |
| JP | 5-54150 A | 3/1993 |
| JP | 9-185508 A | 7/1997 |
| JP | 10-165648 A | 6/1998 |
| JP | 3854033 B2 | 12/2006 |

OTHER PUBLICATIONS

N. Alam, V. Coors, S. Zlatanova, P Oosterom, "Shadow Effect on Photovoltaic Potentiality Analysis Using 3D City Models", International Archives of Photogrammetry, Remote Sensing and Spatial Information Sciences, Colume XXXIX-B8, Sep. 2012, pp. 209-214.*

(Continued)

*Primary Examiner* — Kakali Chaki
*Assistant Examiner* — Walter Hanchak
(74) *Attorney, Agent, or Firm* — Oblon, McClelland, Maier & Neustadt, L.L.P.

(57) ABSTRACT

According to one embodiment, an object retrieval apparatus includes a query acceptance unit and a collision decision unit. The query acceptance unit is configured to accept a retrieval query indicating (N−1)-dimensional surface in N-dimensional space (N is an integral number larger than or equal to three). The collision decision unit is configured to decide whether the (N−1)-dimensional surface intersects N-dimensional cuboid positioned in the N-dimensional space. The collision decision unit decides by using a plurality of decision functions. The plurality of decision functions includes zero-th~(N−1)-th decision functions to decide whether at least a part of at least one of X-dimensional face (X is all integral numbers larger than or equal to zero, and smaller than or equal to (N−1)) of the N-dimensional cuboid is included in the (N−1)-dimensional surface.

21 Claims, 16 Drawing Sheets

(56) References Cited

OTHER PUBLICATIONS

Philip M. Hubbard, "Collision Detection for Interactive Graphics Applications", phD theis and Report CS-95-08, published by Department of Computer Science, Brown University, Apr. 1995, pp. 1-145.*

Ilan Grinberg and Yair Wiseman, "Scalable Parallel Collision Detection Simulation", SIP '07 Proceedings of the Ninth IASTED International Conference on Signal and Image Processing, 2007, pp. 380-385.*

M. Teschner,S. Kimmerle, B. Heidelberger, G. Zachmann, L. Raghupathi, A. Fuhrmann, M.-P. Cani, F. Faure, N. Magnenat-Thalmann, W. Strasser, P. Volino, "Collision Detection for Deformable Objects", Computer Graphics Forum. vol. 24, Issue 1, Mar. 2005, pp. 61-81.*

Stefan Gottschalk, "Collision Queries Using Oriented Bounding Boxes", published by University of North Carolina for phd thesis, 2000, pp. 1-174.*

Chakraborty, N., Jufeng Peng, Akella, S., Mitchell, J.E., "Proximity Queries Between Convex Objects: An Interior Point Approach for Implicit Surfaces", Robotics, IEEE Transactions on (vol. 24 , Issue: 1 ), Feb. 25, 2008, pp. 211-220.*

Hua Guo, "Shortest Path Queries on Polyhedral Surfaces and in Polygonal Domains", phd thesis published by Carleton University, Ottawa, Canada, 2010. pp. 1-252.*

Office Action issued May 7, 2014, in Japanese Patent Application No. 2012-054766 with English translation.

Extended European Search Report issued Jul. 1, 2013 in Patent Application No. 12195449.9.

N. Alam et al., "Shadow Effect on Photovoltaic Potentiality Analysis Using 3D City Models", International Archives of the Photogrammetry, Remote Sensing and Spatial Information Sciences, vol. XXXIX-B8, XP-55067984, Aug. 25-Sep. 1, 2012, pp. 209-214, Retrieved from the Internet: URL:http://www.int-arch-photogramm-remote-sens-spatial-inf-sci.net/XXXIX-B8/209/2012/isprsarchives-XXXIX-B8-209-2012.pdf.

M. C. Lin et al., "Collision Detection Between Geometric Models: A Survey", Mathematics of Surface. Proceedings of a Conference, XP-008033374, Aug. 1, 1998, pp. 37-56.

* cited by examiner

LEAF
MBB:(0,0,0)-(1,1,1)
ID:1

FIG.4

|      | 1 |
|------|---|
| x0x0 | 0 |
| x0y0 | 0 |
| x0y1 | 0 |
| x0z0 | 0 |
| x0z1 | 0 |
| x1x1 | 1 |
| x1y0 | 0 |
| x1y1 | 1 |
| x1z0 | 0 |
| x1z1 | 1 |
| y0y0 | 0 |
| y0z0 | 0 |
| y0z1 | 0 |
| y1y1 | 1 |
| y1z0 | 0 |
| y1z1 | 1 |
| z0z0 | 0 |
| z1z1 | 1 |

FIG.5

| Step | | p(u,v,w) | QUADRATIC FORM f(p) | p0=argmin.f(p) | MIN...f(p0) | DECISION | |
|---|---|---|---|---|---|---|---|
| 1 | C0: | (0,0,0) | 31/16 | - | 31/16 | f(p0)>0. → | NG |
| 2 | | (0,0,1) | 15/16 | - | 15/16 | f(p0)>0 → | NG |
| 3 | | (0,1,0) | 47/16 | - | 47/16 | f(p0)>0 → | NG |
| 4 | | (0,1,1) | 31/16 | - | 31/16 | f(p0)>0. → | NG |
| 5 | | (1,0,0) | 15/16 | - | 15/16 | f(p0)>0. → | NG |
| 6 | | (1,0,1) | -1/16 | - | -1/16 | f(p0)<0 → | OK |
| 7 | | (1,1,0) | - | - | - | - | |
| 8 | | (1,1,1) | - | - | - | - | |
| 9 | C1: | (u,0,0) | | | | | |
| 10 | | (u,0,1) | | | | | |
| 11 | | (u,1,0) | | | | | |
| 12 | | (u,1,1) | | | | | |
| 13 | | (0,v,0) | | | | | |
| 14 | | (0,v,1) | | | | | |
| 15 | | (1,v,0) | | | | | |
| 16 | | (1,v,1) | | | | | |
| 17 | | (0,0,w) | | | | | |
| 18 | | (0,1,w) | | | | | |
| 19 | | (1,0,w) | | | | | |
| 20 | | (1,1,w) | | | | | |
| 21 | C2: | (0,v,w) | | | | | |
| 22 | | (1,v,w) | | | | | |
| 23 | | (u,0,w) | | | | | |
| 24 | | (u,1,w) | | | | | |
| 25 | | (u,v,0) | | | | | |
| 26 | | (u,v,1) | | | | | |
| 27 | C3: | (u,v,w) | | | | | |

FIG.6

| Step | | p(u,v,w) | QUADRATIC FORM f(p) | p0=argmin.f(p) | MIN. f(p0) | DECISION |
|---|---|---|---|---|---|---|
| 1 | C0: | (0,0,0) | 199/144 | - | 199/144 | f(p0)>0 → NG |
| 2 | | (0,0,1) | 151/144 | - | 151/144 | f(p0)>0 → NG |
| 3 | | (0,1,0) | 343/144 | - | 343/144 | f(p0)>0 → NG |
| 4 | | (0,1,1) | 295/144 | - | 295/144 | f(p0)>0 → NG |
| 5 | | (1,0,0) | 55/144 | - | 55/144 | f(p0)>0 → NG |
| 6 | | (1,0,1) | 7/144 | - | 7/144 | f(p0)>0 → NG |
| 7 | | (1,1,0) | 199/144 | - | 199/144 | f(p0)>0 → NG |
| 8 | | (1,1,1) | 151/144 | - | 151/144 | f(p0)>0 → NG |
| 9 | C1: | (u,0,0) | u^2-2*u+199/144 | u=1 | - | ¬p0∈C1 → NG |
| 10 | | (u,0,1) | u^2-2*u+151/144 | u=1 | - | ¬p0∈C1 → NG |
| 11 | | (u,1,0) | u^2-2*u+343/144 | u=1 | - | ¬p0∈C1 → NG |
| 12 | | (u,1,1) | u^2-2*u+295/144 | u=1 | - | ¬p0∈C1 → NG |
| 13 | | (0,v,0) | v^2+199/144 | v=0 | - | ¬p0∈C1 → NG |
| 14 | | (0,v,1) | v^2+151/144 | v=0 | - | ¬p0∈C1 → NG |
| 15 | | (1,v,0) | v^2+55/144 | v=0 | - | ¬p0∈C1 → NG |
| 16 | | (1,v,1) | v^2+7/144 | v=0 | - | ¬p0∈C1 → NG |
| 17 | | (0,0,w) | w^2-4*w/3+199/144 | w=2/3 | 15/16 | p0∈C1 & f(p0)>0 → NG |
| 18 | | (0,1,w) | w^2-4*w/3+343/144 | w=2/3 | 31/16 | p0∈C1 & f(p0)>0 → NG |
| 19 | | (1,0,w) | w^2-4*w/3+55/144 | w=2/3 | -1/16 | p0∈C1 & f(p0)<0 → OK |
| 20 | | (1,1,w) | - | - | - | - |
| 21 | C2: | (0,v,w) | - | - | - | - |
| 22 | | (1,v,w) | - | - | - | - |
| 23 | | (u,0,w) | - | - | - | - |
| 24 | | (u,1,w) | - | - | - | - |
| 25 | | (u,v,0) | - | - | - | - |
| 26 | | (u,v,1) | - | - | - | - |
| 27 | C3: | (u,v,w) | - | - | - | - |

FIG.8

| Step | | p(u,v,w) | QUADRATIC FORM f(p) | p0=argmin.f(p) | MIN. f(p0) | DECISION |
|---|---|---|---|---|---|---|
| 1 | C0: | (0,0,0) | 119/144 | - | 119/144 | f(p0)>0 → NG |
| 2 | | (0,0,1) | 71/144 | - | 71/144 | f(p0)>0 → NG |
| 3 | | (0,1,0) | 263/144 | - | 263/144 | f(p0)>0 → NG |
| 4 | | (0,1,1) | 215/144 | - | 215/144 | f(p0)>0 → NG |
| 5 | | (1,0,0) | 71/144 | - | 71/144 | f(p0)>0 → NG |
| 6 | | (1,0,1) | 23/144 | - | 23/144 | f(p0)>0 → NG |
| 7 | | (1,1,0) | 215/144 | - | 215/144 | f(p0)>0 → NG |
| 8 | | (1,1,1) | 167/144 | - | 167/144 | f(p0)>0 → NG |
| 9 | C1: | (u,0,0) | u^2-4*u/3+119/144 | u = 2/3 | 55/144 | p0∈C1 & f(p0)>0 → NG |
| 10 | | (u,0,1) | u^2-4*u/3+71/144 | u = 2/3 | 7/144 | p0∈C1 & f(p0)>0 → NG |
| 11 | | (u,1,0) | u^2-4*u/3+263/144 | u = 2/3 | 199/144 | p0∈C1 & f(p0)>0 → NG |
| 12 | | (u,1,1) | u^2-4*u/3+215/144 | u = 2/3 | 151/144 | p0∈C1 & f(p0)>0 → NG |
| 13 | | (0,v,0) | v^2+119/144 | v = 0 | - | ¬p0∈C1 → NG |
| 14 | | (0,v,1) | v^2+71/144 | v = 0 | - | ¬p0∈C1 → NG |
| 15 | | (1,v,0) | v^2+71/144 | v = 0 | - | ¬p0∈C1 → NG |
| 16 | | (1,v,1) | v^2+23/144 | v = 0 | - | ¬p0∈C1 → NG |
| 17 | | (0,0,w) | w^2-4*w/3+119/144 | w = 2/3 | 55/144 | p0∈C1 & f(p0)>0 → NG |
| 18 | | (0,1,w) | w^2-4*w/3+263/144 | w = 2/3 | 199/144 | p0∈C1 & f(p0)>0 → NG |
| 19 | | (1,0,w) | w^2-4*w/3+71/144 | w = 2/3 | 7/144 | p0∈C1 & f(p0)>0 → NG |
| 20 | | (1,1,w) | w^2-4*w/3+215/144 | w = 2/3 | 151/144 | p0∈C1 & f(p0)>0 → NG |
| 21 | C2: | (0,v,w) | w^2-4*w/3+v^2+119/144 | (v,w) = (0,2/3) | - | ¬p0∈C2 → NG |
| 22 | | (1,v,w) | w^2-4*w/3+v^2+71/144 | (v,w) = (0,2/3) | - | ¬p0∈C2 → NG |
| 23 | | (u,0,w) | w^2-4*w/3+u^2-4*u/3+119/144 | (u,w) = (2/3,2/3) | -1/16 | p0∈C2 & f(p0)<0 → OK |
| 24 | | (u,1,w) | - | - | - | - |
| 25 | | (u,v,0) | - | - | - | - |
| 26 | | (u,v,1) | - | - | - | - |
| 27 | C3: | (u,v,w) | - | - | - | - |

FIG.10

| Step | | p(u,v,w) | QUADRATIC FORM:f(p) | p0=argmin.f(p) | MIN. f(p0) | DECISION |
|---|---|---|---|---|---|---|
| 1 | C0: | (0,0,0) | 61/48 | - | 61/48 | f(p0)>0 → NG |
| 2 | | (0,0,1) | 15/16 | - | 15/16 | f(p0)>0 → NG |
| 3 | | (0,1,0) | 15/16 | - | 15/16 | f(p0)>0 → NG |
| 4 | | (0,1,1) | 29/48 | - | 29/48 | f(p0)>0 → NG |
| 5 | | (1,0,0) | 15/16 | - | 15/16 | f(p0)>0 → NG |
| 6 | | (1,0,1) | 29/48 | - | 29/48 | f(p0)>0 → NG |
| 7 | | (1,1,0) | 29/48 | - | 29/48 | f(p0)>0 → NG |
| 8 | | (1,1,1) | 13/48 | - | 13/48 | f(p0)>0 → NG |
| 9 | C1: | (u,0,0) | u^2-4*w/3+61/48 | u=2/3 | 119/144 | p0∈C1 & f(p0)>0 → NG |
| 10 | | (u,0,1) | u^2-4*u/3+15/16 | u=2/3 | 71/144 | p0∈C1 & f(p0)>0 → NG |
| 11 | | (u,1,0) | u^2-4*u/3+15/16 | u=2/3 | 71/144 | p0∈C1 & f(p0)>0 → NG |
| 12 | | (u,1,1) | u^2-4*u/3+29/48 | u=2/3 | 23/144 | p0∈C1 & f(p0)>0 → NG |
| 13 | | (0,v,0) | v^2-4*v/3+61/48 | v=2/3 | 119/144 | p0∈C1 & f(p0)>0 → NG |
| 14 | | (0,v,1) | v^2-4*v/3+15/16 | v=2/3 | 71/144 | p0∈C1 & f(p0)>0 → NG |
| 15 | | (1,v,0) | v^2-4*v/3+15/16 | v=2/3 | 71/144 | p0∈C1 & f(p0)>0 → NG |
| 16 | | (1,v,1) | v^2-4*v/3+29/48 | v=2/3 | 23/144 | p0∈C1 & f(p0)>0 → NG |
| 17 | | (0,0,w) | w^2-4*w/3+61/48 | w=2/3 | 119/144 | p0∈C1 & f(p0)>0 → NG |
| 18 | | (0,1,w) | w^2-4*w/3+15/16 | w=2/3 | 71/144 | p0∈C1 & f(p0)>0 → NG |
| 19 | | (1,0,w) | w^2-4*w/3+15/16 | w=2/3 | 71/144 | p0∈C1 & f(p0)>0 → NG |
| 20 | | (1,1,w) | w^2-4*w/3+29/48 | w=2/3 | 23/144 | p0∈C1 & f(p0)>0 → NG |
| 21 | C2: | (0,v,w) | w^2-4*w/3+v^2-4*v/3+61/48 | (v,w)=(2/3,2/3) | 55/144 | p0∈C2 & f(p0)>0 → NG |
| 22 | | (1,v,w) | w^2-4*w/3+v^2-4*v/3+15/16 | (v,w)=(2/3,2/3) | 7/144 | p0∈C2 & f(p0)>0 → NG |
| 23 | | (u,0,w) | w^2-4*w/3+u^2-4*u/3+61/48 | (u,w)=(2/3,2/3) | 55/144 | p0∈C2 & f(p0)>0 → NG |
| 24 | | (u,1,w) | w^2-4*w/3+u^2-4*u/3+15/16 | (u,w)=(2/3,2/3) | 7/144 | p0∈C2 & f(p0)>0 → NG |
| 25 | | (u,v,0) | v^2-4*v/3+u^2-4*u/3+61/48 | (u,v)=(2/3,2/3) | 55/144 | p0∈C2 & f(p0)>0 → NG |
| 26 | | (u,v,1) | v^2-4*v/3+u^2-4*u/3+15/16 | (u,v)=(2/3,2/3) | 7/144 | p0∈C2 & f(p0)>0 → NG |
| 27 | C3: | (u,v,w) | w^2-4*w/3+v^2-4*v/3+u^2-4*u/3+61/48 | (u,v,w)=(2/3,2/3,2/3) | -1/16 | p0∈C3 & f(p0)<0 → OK |

FIG.12

| Step | | p(u,v,w) | QUADRATIC FORM f(p) | p0=argmin.f(p) | MIN. f(p0) | DECISION |
|---|---|---|---|---|---|---|
| 1 | C0: | (0,0,0) | 75/16 | - | 75/16 | f(p0)>0 → NG |
| 2 | | (0,0,1) | 75/16 | - | 75/16 | f(p0)>0 → NG |
| 3 | | (0,1,0) | 43/16 | - | 43/16 | f(p0)>0 → NG |
| 4 | | (0,1,1) | 43/16 | - | 43/16 | f(p0)>0 → NG |
| 5 | | (1,0,0) | 43/16 | - | 43/16 | f(p0)>0 → NG |
| 6 | | (1,0,1) | 43/16 | - | 43/16 | f(p0)>0 → NG |
| 7 | | (1,1,0) | 11/16 | - | 11/16 | f(p0)>0 → NG |
| 8 | | (1,1,1) | 11/16 | - | 11/16 | f(p0)>0 → NG |
| 9 | C1: | (u,0,0) | u^2-3*u+75/16 | u = 3/2 | - | ¬p0∈C1 → NG |
| 10 | | (u,0,1) | u^2-3*u+75/16 | u = 3/2 | - | ¬p0∈C1 → NG |
| 11 | | (u,1,0) | u^2-3*u+43/16 | u = 3/2 | - | ¬p0∈C1 → NG |
| 12 | | (u,1,1) | u^2-3*u+43/16 | u = 3/2 | - | ¬p0∈C1 → NG |
| 13 | | (0,v,0) | v^2-3*v+75/16 | v = 3/2 | - | ¬p0∈C1 → NG |
| 14 | | (0,v,1) | v^2-3*v+75/16 | v = 3/2 | - | ¬p0∈C1 → NG |
| 15 | | (1,v,0) | v^2-3*v+43/16 | v = 3/2 | - | ¬p0∈C1 → NG |
| 16 | | (1,v,1) | v^2-3*v+43/16 | v = 3/2 | - | ¬p0∈C1 → NG |
| 17 | | (0,0,w) | w^2-w+75/16 | w = 1/2 | 71/16 | p0∈C1 & f(p0)>0 → NG |
| 18 | | (0,1,w) | w^2-w+43/16 | w = 1/2 | 39/16 | p0∈C1 & f(p0)>0 → NG |
| 19 | | (1,0,w) | w^2-w+43/16 | w = 1/2 | 39/16 | p0∈C1 & f(p0)>0 → NG |
| 20 | | (1,1,w) | w^2-w+11/16 | w = 1/2 | 7/16 | p0∈C1 & f(p0)>0 → NG |
| 21 | C2: | (0,v,w) | w^2-w+v^2-3*v+75/16 | (v,w)=(3/2,1/2) | - | ¬p0∈C2 → NG |
| 22 | | (1,v,w) | w^2-w+v^2-3*v+43/16 | (v,w)=(3/2,1/2) | - | ¬p0∈C2 → NG |
| 23 | | (u,0,w) | w^2-w+u^2-3*u+75/16 | (u,w)=(3/2,1/2) | - | ¬p0∈C2 → NG |
| 24 | | (u,1,w) | w^2-w+u^2-3*u+43/16 | (u,w)=(3/2,1/2) | - | ¬p0∈C2 → NG |
| 25 | | (u,v,0) | v^2-3*v+u^2-3*u+75/16 | (u,v)=(3/2,3/2) | - | ¬p0∈C2 → NG |
| 26 | | (u,v,1) | v^2-3*v+u^2-3*u+43/16 | (u,v)=(3/2,3/2) | - | ¬p0∈C2 → NG |
| 27 | C3: | (u,v,w) | w^2-w+v^2-3*v+u^2-3*u+75/16 | (u,v,w)=(3/2,3/2,1/2) | - | ¬p0∈C3 → NG |

FIG.14

|      | 1 | 2   | 3   |
|------|---|-----|-----|
| x0x0 | 0 | 100 | 121 |
| x0y0 | 0 | 0   | 0   |
| x0y1 | 0 | 10  | 20  |
| x0z0 | 0 | 0   | 0   |
| x0z1 | 0 | 10  | 20  |
| x1x1 | 1 | 121 | 242 |
| x1y0 | 0 | 0   | 0   |
| x1y1 | 1 | 11  | 21  |
| x1z0 | 0 | 0   | 0   |
| x1z1 | 1 | 11  | 21  |
| y0y0 | 0 | 0   | 0   |
| y0z0 | 0 | 0   | 0   |
| y0z1 | 0 | 0   | 0   |
| y1y1 | 1 | 1   | 1   |
| y1z0 | 0 | 0   | 0   |
| y1z1 | 1 | 1   | 1   |
| z0z0 | 0 | 0   | 0   |
| z1z1 | 1 | 1   | 1   |

APPARATUS AND A METHOD FOR RETRIEVING AN OBJECT

CROSS-REFERENCE TO RELATED APPLICATION

This application is based upon and claims the benefit of priority from Japanese Patent Application No. 2012-054766, filed on Mar. 12, 2012; the entire contents of which are incorporated herein by reference.

FIELD

Embodiments described herein relate generally to an apparatus and a method for retrieving an object.

BACKGROUND

A three-dimensional database controls a set of objects positioned in a spatiotemporal space. For example, the objects are three-dimensional (3D) objects of application software such as GIS or CAD. The three-dimensional database has a function to accept a query indicating a range and return a list of objects included in the range. As a data structure/index of the database, R-tree, Quad-tree, or expansion thereof, are used.

As conventional technique, a function to decide invention/collision by using a quadric surface is known. As to this function, a quadric surface approximating an object (represented as a polyhedron) is generated, and collision decision is simply performed by using the quadric surface. In this case, parts (components) in a machine densely including at largest 10000 parts are decided whether to collide. This technique does not attach importance to accuracy of approximation, and each part is very roughly approximated as a minimum bounded box. On the other hand, in order to quickly decide whether to collide with a quadric surface (indicated), decision steps are finely controlled.

Furthermore, as a thesis thereof, R-tree (Antonin Guttman: R-Trees: A Dynamic Index Structure for Spatial Searching, Proc. 1984 ACM SIGMOD International Conference on Management of Data, pp. 47-57. ISBN 0-89791-128-8), and Quad-tree (Raphael Finkel and J. L. Bentley (1974), "Quad Trees: A Data Structure for Retrieval on Composite Keys", Acta Informatica 4 (1): doi:10.1007/BF00288933), are well known. In these theses, a data structure to process a large number (such as a million units) of objects is disclosed. However, a region indicated by a query is only a rectangle. Accordingly, the query cannot be finely controlled such as a quadric surface.

Briefly, in R-tree and Quad-tree, each object is controlled as a unit of minimum bounded box (MBB) surrounding the object, and a region indicated by the query is also a cuboid.

However, in 3D database to control position (location) of a PV (Photovoltaic power generation) device (panel), a query such as a list of objects (PV panel) included in a shadow of a building, a list of objects included in a view from some viewpoint, or a list of objects inside a circle having a radius of n km from the indicated point, is often generated.

BRIEF DESCRIPTION OF THE DRAWINGS

FIG. 4 is an example of a tree having one leaf.
FIG. 5 is one example of values of vector product.
FIG. 6 is an example of processing result according to an embodiment A.
FIG. 8 is an example of processing result according to an embodiment B.
FIG. 10 is an example of processing result according to an embodiment C.
FIG. 12 is an example of processing result according to an embodiment D.
FIG. 14 is an example of processing result according to an embodiment E.
FIG. 17 is another example of values of vector product.

DETAILED DESCRIPTION

According to one embodiment, an object retrieval apparatus includes a query acceptance unit and a collision decision unit. The query acceptance unit is configured to accept a retrieval query indicating (N−1)-dimensional surface in N-dimensional space (N is an integral number larger than or equal to three). The collision decision unit is configured to decide whether the (N−1)-dimensional surface intersects N-dimensional cuboid positioned in the N-dimensional space. The collision decision unit has a plurality of decision functions including zero-th~(N−1)-th decision functions to decide whether at least a part of at least one of X-dimensional face (X is all integral numbers larger than or equal to zero, and smaller than or equal to (N−1)) of the N-dimensional cuboid is included in the (N−1)-dimensional surface, and decides by using the plurality of decision functions.

Various embodiments will be described hereinafter with reference to the accompanying drawings.

As to embodiments of the present invention, a query indicating a quadric surface (such as a cone, a column, a sphere) is accepted, and a list of minimum bounded boxes (MBB) intersecting the quadric surface is effectively calculated. If collision between the quadric surface and the minimum bounded box is decided by using themselves, calculation thereof is not effective. Accordingly, by previously extracting objects (MBB) colliding with MBB of the quadric surface, the number of candidates of decision targets is decreased. Furthermore, collision decision of objects in low-dimension (calculation thereof is simple) is executed in advance. After that, as for objects decided not to collide, collision decision of the objects in high-dimension is executed. Furthermore, in order to reduce calculation amount of the collision decision in each dimension, a value of vector product of each peak of each MBB is previously calculated, and stored in a cache memory.

By using above-mentioned idea, a list of objects (MBB) colliding with the quadric surface (indicated) can be effectively acquired. In case of the Photovoltaic power generation (PV) device (panel), the PV panel can be positioned (located)

by considering whether to be taken cover by buildings. In this case, for example, the quadric surface is an area by a shadow or a reflected light of a predetermined object. Furthermore, 3D rendering can be quickly performed. This idea can be applied to general usage (CAD) such as position of parts in machine or design of building.

Briefly, by using the present embodiment, in a space in which objects (the number thereof is above a million units) are roughly positioned, a list of objects included in the quadric surface (indicated) can be quickly acquired.

Hereinafter, by referring to Figs, the present embodiment is explained in detail.

Figure 1:
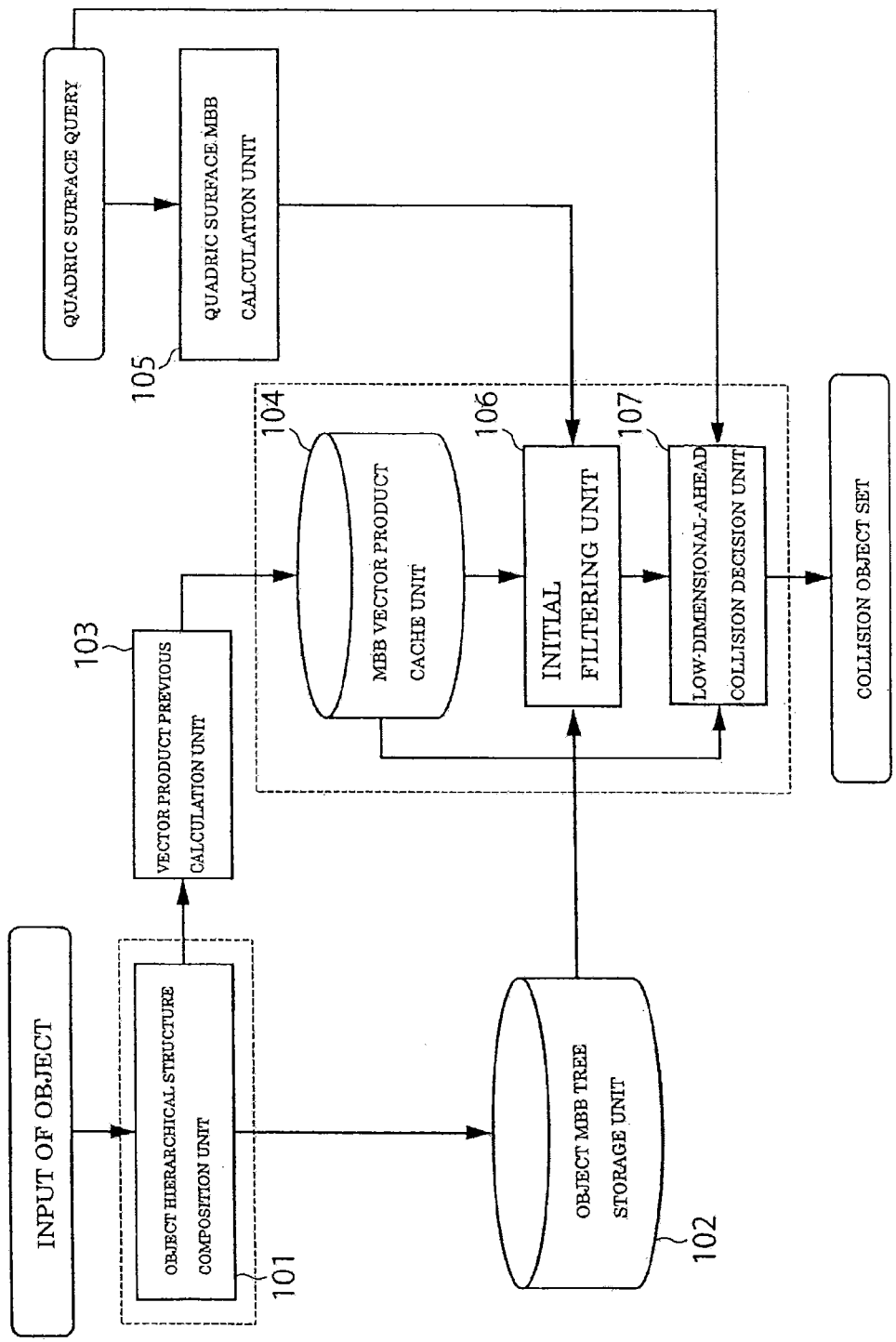
FIG. 1 is a block diagram of an object retrieval apparatus according to embodiments.

FIG. 1 is a block diagram of an object retrieval apparatus of 3D database according to the present embodiment.

An object hierarchical structure composition unit 101 calculates a minimum bounded box (MBB) of an object supplied from the outside. Furthermore, the object hierarchical structure composition unit 101 collects objects adjacently located in the space, and calculates a minimum bounded box (MBB) of the collected one. By repeating this processing, a hierarchical structure of object MBB is generated.

An object MBB tree storage unit 102 stores the hierarchical structure outputted by the object hierarchical structure composition unit 101.

A vector product previous calculation unit 103 calculates a vector product of each axis for MBB of each object.

A MBB vector product cache unit 104 stores the vector product outputted by the vector product previous calculation unit 103.

A quadric surface MBB calculation unit 105 accepts a quadric surface query including coefficients of a quadric surface representing a target region to be retrieved, and calculates MBB of the quadric surface.

An initial filtering unit 106 extracts (lists) partial trees having (intersecting) common part with MBB of the quadric surface from each hierarchy stored in the object MBB tree storage unit 102.

A collision decision unit (low-dimensional-ahead collision decision unit) 107 extracts elements having common part with the quadric surface of the query from the partial trees extracted by the initial filtering unit 106.

Hereinafter, detail processing of each unit is explained.

The Object Hierarchical Structure Composition Unit 101

The object hierarchical structure composition unit 101 calculates a minimum bounded box (MBB) of each object. Each edge of the minimum bounded box is in parallel with any of X-axis, Y-axis and Z-axis. Moreover, the present embodiment is not limited to MBB of object. In general, as for a cuboid located in three-dimensional space, the present embodiment can be applied to decision whether to intersect a quadric surface. Furthermore, a cuboid as a target of intersection decision may not be in parallel with X-axis, Y-axis and Z-axis.

Next, objects of which MBBs are adjacently located is collected as one group, and MBB of the group is calculated. The group is regarded as a node, and each object in the group is regarded as a leaf. By repeatedly regarding a plurality of groups as a node, a hierarchical structure represented as a balanced tree structure is generated. Furthermore, when addition or deletion of an object occurs, the tree structure is changed so as to maintain characteristic thereof.

This unit is same as the known method, i.e., R-tree (Antonin Guttman: R-Trees: A Dynamic Index Structure for Spatial Searching, Proc. 1984 ACM SIGMOD International Conference on Management of Data, pp. 47-57. ISBN 0-89791-128-8), or Quad-tree (Raphael Finkel and J. L. Bentley (1974), "Quad Trees: A Data Structure for Retrieval on Composite Keys", Acta Informatica 4 (1): doi:10.1007/BF00288933). Refer to these theses.

The Object MBB Tree Storage Unit 102

The object MBB tree storage unit 102 stores a hierarchical structure (generated by the object hierarchical structure composition unit 101) for MBB of each object, into inside thereof.

The Vector Product Previous Calculation Unit 103

The vector product previous calculation unit 103 calculates a vector product of each peak of MBB. In the present embodiment, the vector product is defined as follows. Assume that some typical peak is (x0, y0, z0) and a peak oppositely positioned to the typical peak is (x1, y1, z1). Following eighteen values are vector products.

x0x0 x0y0 x0y1 x0z0 x0z1
x1x1 x1y0 x1y1 x1z0 x1z1
y0y0 y0z0 y0z1
y1y1 y1z0 y1z1
z0z0
z1z1

The MBB Vector Product Cache Unit 104

The MBB vector product cache unit 104 stores the vector product calculated by the vector product previous calculation unit 103.

The Quadric Surface MBB Calculation Unit 105

The quadric surface MBB calculation unit 105 accepts a quadric surface query including coefficients of a quadric surface representing a region to be retrieved, and calculates MBB of the quadric surface. This MBB is defined only when the quadric surface is finite (a sphere or an ellipsoid). When the quadric surface is not finite, the quadric surface MBB calculation unit 105 returns MBB representing infinite region, i.e., some peak is ($-\infty, -\infty, -\infty$) and a peak oppositely positioned thereto is ($\infty, \infty, \infty$).

The Initial Filtering Unit 106

The initial filtering unit 106 extracts (lists) partial trees or objects having (intersecting) common part with MBB (Hereinafter, it is called "a query MBB") of the quadric surface from each hierarchy stored in the object MBB tree storage unit 102.

Concretely, the initial filtering unit 106 decides whether MBB of the highest level node in the tree structure (representing a set of objects) intersects the query MBB. In case of intersection, each child node (leaf node) of the highest level node is decided whether to intersect the query MBB.

When a child node intersecting the query MBB is found, this child node is outputted to the collision decision unit 107, and decided whether to correctly intersect the quadric surface. In case of intersection, this child node is recursively (repeatedly) decided whether to intersect the query MBB.

The Collision Decision Unit 107

The collision decision unit 107 accepts the quadric surface query and MBB of partial trees (or objects) listed by the initial filtering unit 106, and decides intersection thereof.

The intersection decision is performed for each dimension. Briefly, following four types and, totally, twenty seven decisions are performed.

Eight points (peaks of MBB) in zero-dimension are listed, and it is decided whether any of the eight points is included in a quadric surface of the quadric surface query (C0 test).

Twelve lines (edges of MBB) in one-dimension are listed, and it is decided whether at least one of any of the twelve lines is included in the quadric surface of the quadric surface query (C1 test).

Six rectangles (faces of MBB) in two-dimension are listed, and it is decided whether at least one of any of the six rectangles is included in the quadric surface of the quadric surface query (C2 test).

It is decided whether the quadric surface of the quadric surface query is included in a body (body of MBB) in three-dimension (C3 test).

The collision decision unit 107 prepares a decision function (decision unit) for C0 test, a decision function for C1 test, a decision function for C2 test, and a decision function for C3 test.

When intersection (inclusion) is decided at any test, MBB intersects the quadric surface as a whole.

In this case, if the collision decision unit 107 already accepted partial trees from the initial filtering unit 106, the collision decision unit 107 returns "intersection" to the initial filtering unit 106. if the collision decision unit 107 already accepted an object from the initial filtering unit 106, the collision decision unit 107 outputs the object as a collision object.

As a first operation example of the collision decision unit 107, low-dimensional decision is preferentially performed. When intersection is decided at any of low-dimensional decisions, "intersection" is output, and higher-dimensional decision is not performed.

As a second operation example, the collision decision unit 107 executes low-dimensional decision and high-dimensional decision in parallel. When collision is decided at the low-dimensional decision, the decision processing is completed at this timing. When collision is not decided at the low-dimension decision, decision result at the high-dimensional decision is waited.

Figure 2:
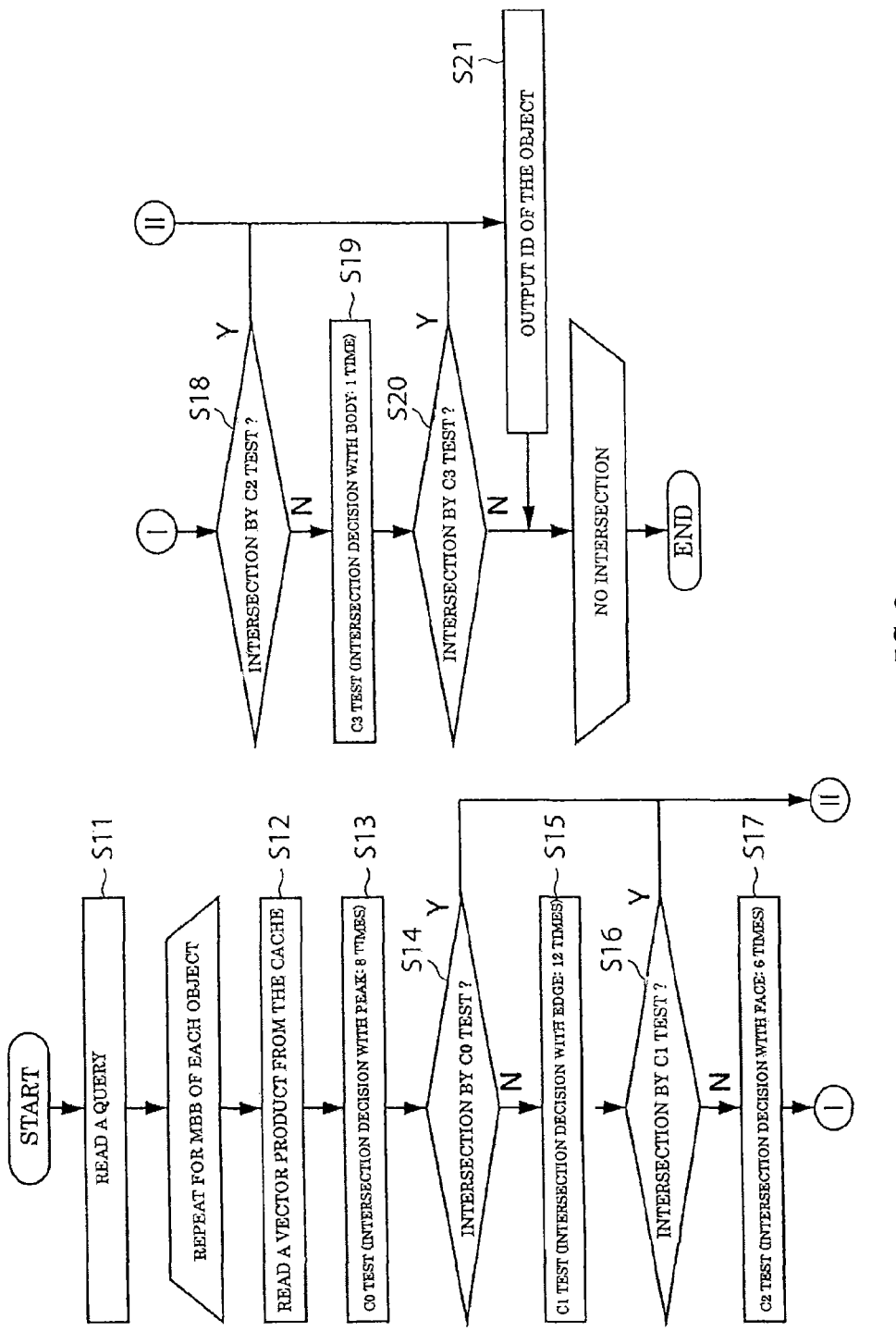
FIG. 2 is a flow chart of a first operation example of the object retrieval apparatus.

FIG. 2 is a flow chart of the first operation example.

The quadric surface query is read (S11). Processing S12~S21 is repeated for each object MBB. The vector product is read from the MBB vector product cache unit 104 (S12), and C0 test is performed (S13). When intersection is acquired at C0 test (Yes at S14), an object ID thereof is outputted (S21). If not so (No at S14), C1 test is performed (S15). When intersection is acquired at C1 test (Yes at S16), an object ID thereof is outputted (S21). If not so (No at S16), C2 test is performed (S17). When intersection is acquired at C2 test (Yes at S18), an object ID thereof is outputted (S21). If not so (No at S18), C3 test is performed (S19). When intersection is acquired at C3 test (Yes at S20), an object ID thereof is outputted (S21). If not so (No at S20), "no intersection" is lastly decided for the object MBB.

Figure 3:
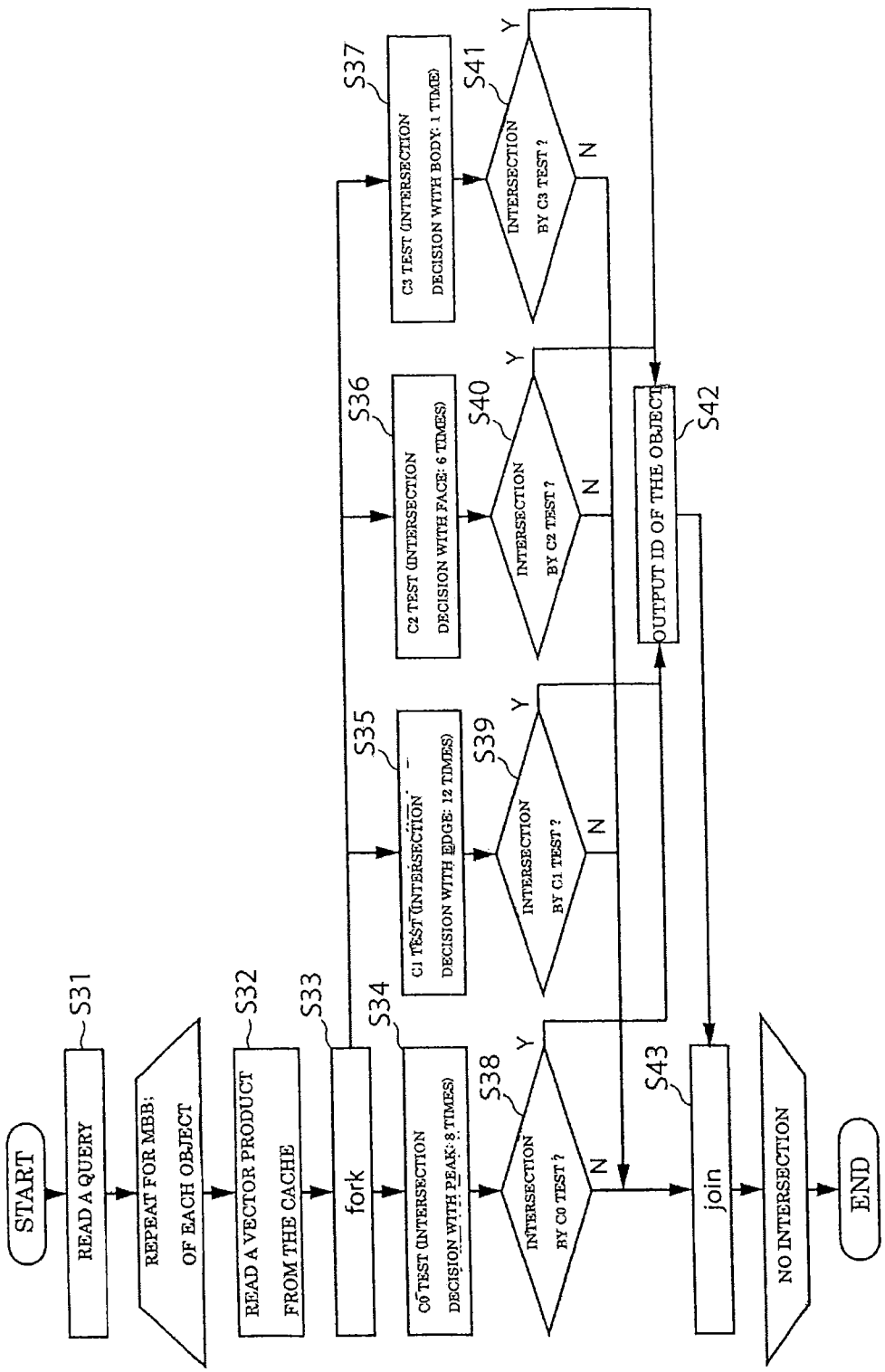
FIG. 3 is a flow chart of a second operation example of the object retrieval apparatus.

FIG. 3 is a flow chart of the second operation example.

The quadric surface query is read (S31). Processing S32~S43 is repeated for each object MBB. The vector product is read from the MBB vector product cache unit 104 (S32). C0 test, C1 test, C2 test and C3 test are performed in parallel (S34, S35, S36, S37). In this case, for example, each test is performed by using different operation devices (performance thereof may be different or same). Whether to decide "intersection" at any test is inspected (S38, S39, S40, S41). When decision result of intersection is acquired at any test, an Object ID is outputted (S42), and other tests being continued is completed. When decision result of intersection is not acquired at all tests, "no intersection (no collision)" is lastly outputted as the decision result. Moreover, "fork" described in a block of S33 represents a blanch start of parallel processing, and "join" described in a block of S93 represents a synchronization (barrier) of parallel processing.

Here, the collision decision unit 107 may not install all decision functions C0, C1, C2 and C3. For example, if it is known beforehand that the quadric surface is not included in the object MBB, or if such inspection is not necessary, only decision functions C0, C1 and C2 may be installed.

In following embodiments, the case of three-dimensional space is explained. In general, three-dimensional space can be expanded to N-dimensional space (N is an integral number larger than or equal to three). In this case, the quadric surface is replaced with (N−1)-dimensional space. Furthermore, the minimum bounded box (or bounded box) is replaced with a minimum bounded N-dimensional box (or bounded N-dimensional box). Furthermore, a point, a line, a face and so on, are replaced with X-dimensional (X is an integral number larger than or equal to zero and smaller than or equal to (N−1)) face.

Embodiment A

In the present embodiment, only one unit cube exists as an object. As to the unit cube, some peak is (0,0,0) and an opposite peak thereto is (1,1,1). In this case, a quadric surface representing a sphere having a center (1,0,1) and a radius 1/4 is given as a query. Hereinafter, an example of operation of each unit is explained.

An equation of this query is represented as follows.

$$0 \geq z^2 - 2{*}z + y^2 + x^2 - 2{*}x + 31/16$$

Operation of the Object Hierarchical Structure Composition Unit 101 in the Embodiment A The one cube is accepted, and MBB thereof is calculated. In this case, the MBB is matched with the (original) one cube. The number of objects to be processed is only one. Accordingly, as shown in FIG. 4, a tree having one leaf is stored.

Operation of the Object MBB Tree Storage Unit 102 in the Embodiment A

The tree (FIG. 4) having one leaf (generated by the object hierarchical structure composition unit 101) is stored.

Operation of the Vector Product Previous Calculation Unit 103 in the Embodiment A As to a typical peak (0,0,0) and an opposite peak (1,1,1) thereto, above-mentioned values (eighteen units) of the vector product is calculated.

Operation of the MBB Vector Product Cache Unit 104 in the Embodiment A

The values of the vector product (calculated by the vector product previous calculation unit 103) are stored as a table format shown in FIG. 5.

Operation of the Quadric Surface MBB Calculation Unit 105 in the Embodiment A In the present embodiment, a quadric surface of the quadric surface query is a sphere. Accordingly, (3/4,3/4,3/4)-(5/4,5/4,5/4) is calculated as MBB.

Operation of the Initial Filtering Unit 106 in the Embodiment A

It is decided whether (3/4,3/4,3/4)-(5/4,5/4,5/4) as MBB of the quadric surface query intersects (0,0,0)-(1,1,1) as the object MBB.

In order to decide intersection between two cuboids in parallel with x-axis, y-axis and z-axis, whether to have intersection along each axis is independently decided. When two cuboids have intersection along all axes, the two cuboids can be decided to intersect. Accordingly, this decision is simple in calculation amount.

First, as to x-axis, it is decided whether a range "0~1" of the object MBB intersects a range "3/4~5/4" of the quadric surface query MBB. In this case, a range "3/4~1" is intersected.

Next, as to y-axis, it is decided whether a range "0~1" of the object MBB intersects a range "3/4~5/4" of the quadric surface query MBB. In this case, a range "3/4~1" is intersected.

Next, as to z-axis, it is decided whether a range "0~1" of the object MBB intersects a range "3/4~5/4" of the quadric surface query MBB. In this case, a range "3/4~1" is intersected.

From mentioned-above, the quadric surface query MBB intersects the object MBB. Accordingly, this object ID is outputted to the collision decision unit 107.

Operation of the Collision Decision Unit 107 in the Embodiment A

It is decided whether a quadric surface of the quadric surface query intersects (0,0,0)-(1,1,1) as the object MBB.

First, as C0 test, it is decided whether any of eight peaks of the object MBB is included in the quadric surface.

In C0 test, by substituting values of peaks for an equation (Hereinafter, it is called a quadratic form) of the quadric surface, it is decided whether a value of the equation is smaller than or equal to zero. The quadratic form is above-mentioned "$0 \geq z^2 - 2*z + y^2 + x^2 - 2*x + 31/16$".

First, by substituting a typical peak (0,0,0) for the quadratic form, a value thereof is 31/16. This value is larger than zero. Accordingly, this peak is not included in the quadric face.

Next, by substituting a typical peak (0,0,1) for the quadratic form, a value thereof is 15/16. This value is larger than zero. Accordingly, this peak is not included in the quadric face.

Next, by substituting a typical peak (0,1,0) for the quadratic form, a value thereof is 47/16. This value is larger than zero. Accordingly, this peak is not included in the quadric face.

Next, by substituting a typical peak (0,1,1) for the quadratic form, a value thereof is 31/16. This value is larger than zero. Accordingly, this peak is not included in the quadric face.

Next, by substituting a typical peak (1,0,0) for the quadratic form, a value thereof is 15/16. This value is larger than zero. Accordingly, this peak is not included in the quadric face.

Next, by substituting a typical peak (1,0,1) for the quadratic form, a value thereof is −1/16. This value is smaller than zero. Accordingly, this peak is included in the quadric face.

A matter that some peak is included in the quadric surface means that the MBB intersects the quadric surface.

When above-mentioned calculation is performed, values of $z^2$, $y^2$ and $x^2$ are frequently necessary. Accordingly, by referring these values to vector products stored in the MBB vector product cache storage unit 104, this calculation can be quickly executed.

This MBB is an MBB of the object. Accordingly, the collision decision unit 107 outputs ID of this object.

FIG. 6 shows a table storing above-mentioned procedure.

Effect of the Embodiment A

For a set of objects, a partial set of objects which intersects the quadric surface as a retrieval range (indicated by the query) can be quickly acquired.

Figure 7:
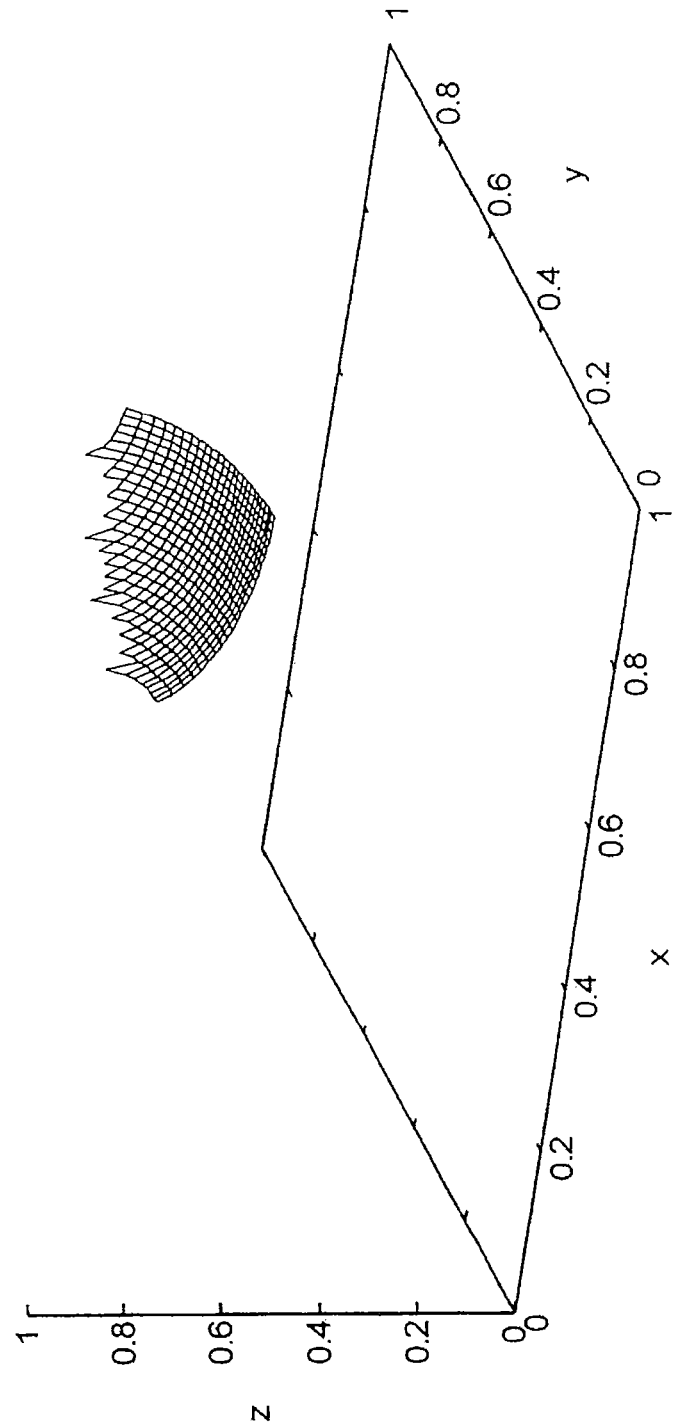
FIG. 7 is a collision decision result according to the embodiment A.

As shown in FIG. 7, this object actually intersects the query. Accordingly, this decision is correct. Moreover, FIG. 7 is drawn by Maxima.

The Embodiment B

In the present embodiment, only one unit cube exists as an object. As to the unit cube, some peak is (0,0,0) and an opposite peak thereto is (1,1,1). In this case, a quadric surface representing a sphere having a center (1,0,2/3) and a radius 1/4 is given as a query. Hereinafter, an example of operation of each unit is explained.

An equation of this query is represented as follows.

$$0 \geq z^2 - 2*z + y^2 + x^2 - 2*x + 31/16$$

Operation of the Object Hierarchical Structure Composition Unit 101 in the Embodiment B This operation is same as the embodiment A. Accordingly, explanation thereof is omitted.

Operation of the Object MBB Tree Storage Unit 102 in the Embodiment B

This operation is same as the embodiment A. Accordingly, explanation thereof is omitted.

Operation of the Vector Product Previous Calculation Unit 103 in the Embodiment B This operation is same as the embodiment A. Accordingly, explanation thereof is omitted.

Operation of the MBB Vector Product Cache Unit 104 in the Embodiment B

This operation is same as the embodiment A. Accordingly, explanation thereof is omitted.

Operation of the Quadric Surface MBB Calculation Unit 105 in the Embodiment B In the present embodiment, a quadric surface of the quadric surface query is a sphere. Accordingly, (3/4,3/4,5/12)-(5/4,5/4,11/12) is calculated as MBB.

Operation of the Initial Filtering Unit 106 in the Embodiment B

It is decided whether (3/4,3/4,5/12)-(5/4,5/4,11/12) as MBB of the quadric surface query intersects (0,0,0)-(1,1,1) as the object MBB.

As mentioned in the embodiment A, in order to decide intersection between two cuboids in parallel with x-axis, y-axis and z-axis, whether to have intersection along each axis is independently decided. When two cuboids have intersection along all axes, the two cuboids can be decided to intersect. Accordingly, this decision is simple in calculation amount.

First, as to x-axis, it is decided whether a range "0~1" of the object MBB intersects a range "3/4~5/4" of the quadric surface query MBB. In this case, a range "3/4~1" is intersected.

Next, as to y-axis, it is decided whether a range "0~1" of the object MBB intersects a range "3/4~5/4" of the quadric surface query MBB. In this case, a range "3/4~1" is intersected.

Next, as to z-axis, it is decided whether a range "0~1" of the object MBB intersects a range "5/12~11/12" of the quadric surface query MBB. In this case, a range "5/12~11/12" is intersected.

From mentioned-above, the quadric surface query MBB intersects the object MBB. Accordingly, this object ID is outputted to the collision decision unit 107.

Operation of the Collision Decision Unit 107 in the Embodiment B

It is decided whether a quadric surface of the quadric surface query intersects (0,0,0)-(1,1,1) as the object MBB.

First, as C0 test, it is decided whether any of eight peaks of the object MBB is included in the quadric surface.

In C0 test, by substituting values of peaks for the quadratic form, it is decided whether a value of the quadratic form is smaller than or equal to zero. The quadratic form is "$0 \geq z^2 - 4*z/3 + y^2 + x^2 - 2*x + 199/144$".

FIG. 8 shows a table storing procedure result of the embodiment B.

At Step 1~Step 8 in C0 test, any peaks are not included in the quadric surface.

Next, as C1 test, it is decided whether any of twelve edges is included in the quadric surface.

In C1 test, by substituting an equation of straight line passing each edge for the quadratic form, a minimum and a maximum of the quadratic form are checked. Because, both ends (peaks) of each edge are not included in the quadratic form, and if any edge intersects the quadric surface, a convex part of the quadric surface is included in a range of the edge, and the minimum of the quadric surface is smaller than or equal to zero.

At Step 9, it is decided whether an edge (0,0,0)-(1,0,0) of the MBB intersects the quadric surface. By substituting (x,y,z)=(u,0,0) for the quadratic form, an equation "$u^2 - 2*u + 199/144$" is acquired. This quadric surface has the minimum at u=1. A point u=1 is an end of the edge (i.e., a peak of the MBB) and, in C1 test, each peak does not intersect the quadric surface. Accordingly, this edge does not intersect the quadric surface.

At Step 10~Step 16, in the same way, no intersection is decided.

At Step 17, it is decided whether an edge (0,0,0)-(0,0,1) of the MBB intersects the quadric surface. By substituting (x,y,z)=(0,0,w) for the quadratic form, an equation "$w^2 - 4*w/3 + 199/144$" is acquired. This quadric surface has the minimum at u=2/3. This point is included in a range "0~1" of the edge and not the peak. In order to calculate a minimum of the quadric surface, "w=2/3" is substituted for the equation. As a result, the value of the equation is 15/16 larger than zero. At the minimum point, this edge does not intersect the quadric surface.

At Step 18, in the same way, no intersection is decided.

At Step 19, the equation has the minimum at w=2/3. At this point, a minimum of the quadric surface is −1/16 smaller than zero. Accordingly, this edge intersects the quadric surface.

As a result, this MBB intersects the quadric surface.

This MBB is an MBB of the object. Accordingly, the collision decision unit 107 outputs an ID of the object.

Effect of the Embodiment B

For a set of objects, a partial set of objects which intersects the quadric surface as a retrieval range (indicated by the query) can be quickly acquired.

Figure 9:
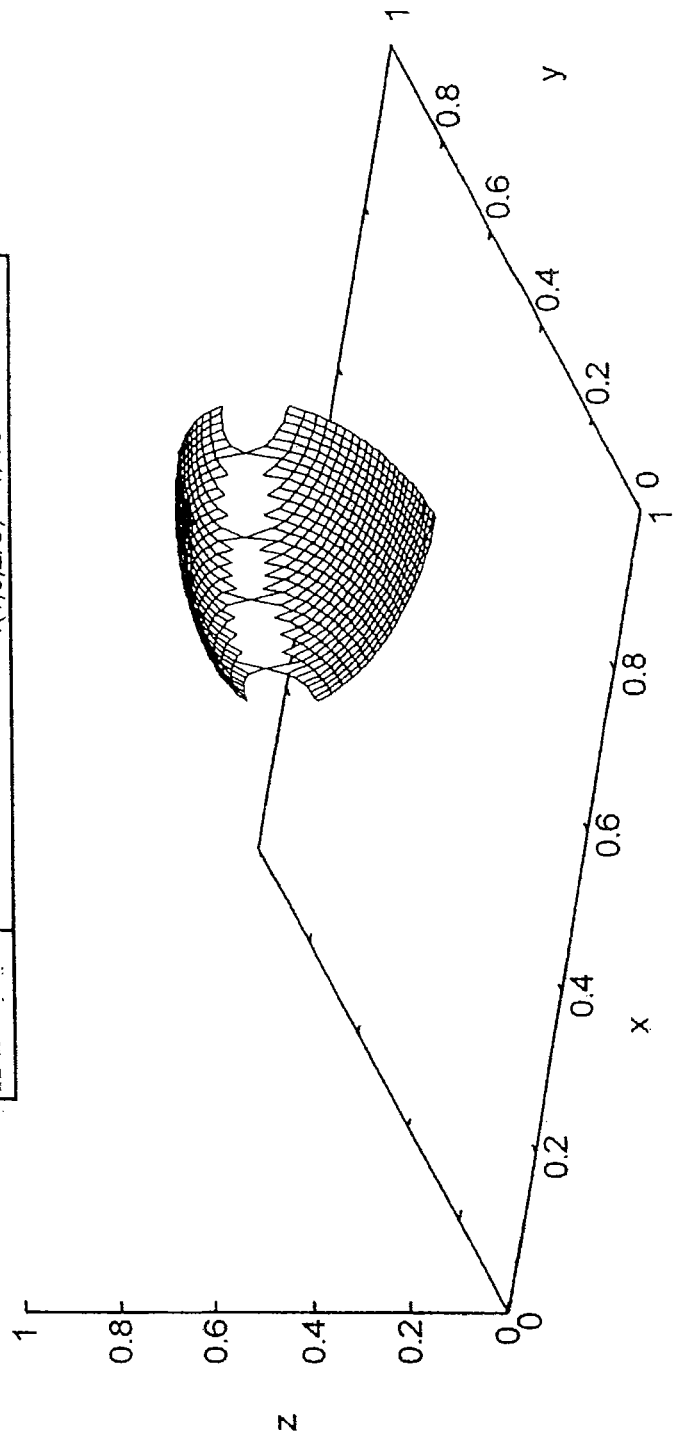
FIG. 9 is a collision decision result according to the embodiment B.

As shown in FIG. 9, this object actually intersects the query. Accordingly, this decision is correct.

The Embodiment C

In the present embodiment, only one unit cube exists as an object. As to the unit cube, some peak is (0,0,0) and an opposite peak thereto is (1,1,1). In this case, a quadric surface representing a sphere having a center (2/3,0,2/3) and a radius 1/4 is given as a query. Hereinafter, an example of operation of each unit is explained.

An equation of this query is represented as follows.

$$0 \geq z^2 - 4*z/3 + y^2 + x^2 - 4*x/3 + 119/144$$

Operation of the Object Hierarchical Structure Composition Unit 101 in the Embodiment C This operation is same as the embodiment A. Accordingly, explanation thereof is omitted.

Operation of the Object MBB Tree Storage Unit 102 in the Embodiment C

This operation is same as the embodiment A. Accordingly, explanation thereof is omitted.

Operation of the Vector Product Previous Calculation Unit 103 in the Embodiment C This operation is same as the embodiment A. Accordingly, explanation thereof is omitted.

Operation of the MBB Vector Product Cache Unit 104 in the Embodiment C

This operation is same as the embodiment A. Accordingly, explanation thereof is omitted.

Operation of the Quadric Surface MBB Calculation Unit 105 in the Embodiment C

In the present embodiment, a quadric surface of the quadric surface query is a sphere. Accordingly, (5/12,3/4,5/12)-(11/12,5/4,11/12) is calculated as MBB.

Operation of the Initial Filtering Unit 106 in the Embodiment C

It is decided whether (5/12,3/4,5/12)-(11/12,5/4,11/12) as MBB of the quadric surface query intersects (0,0,0)-(1,1,1) as the object MBB.

As mentioned in the embodiment A, in order to decide intersection between two cuboids in parallel with x-axis, y-axis and z-axis, whether to have intersection along each axis is independently decided. When two cuboids have intersection along all axes, the two cuboids can be decided to intersect. Accordingly, this decision is simple in calculation amount.

First, as to x-axis, it is decided whether a range "0~1" of the object MBB intersects a range "5/12~11/12" of the quadric surface query MBB. In this case, a range "5/12~11/12" is intersected.

Next, as to y-axis, it is decided whether a range "0~1" of the object MBB intersects a range "3/4~5/4" of the quadric surface query MBB. In this case, a range "3/4~1" is intersected.

Next, as to z-axis, it is decided whether a range "0~1" of the object MBB intersects a range "5/12~11/12" of the quadric surface query MBB. In this case, a range "5/12~11/12" is intersected.

From mentioned-above, the quadric surface query MBB intersects the object MBB. Accordingly, this object ID is outputted to the collision decision unit 107.

Operation of the Collision Decision Unit 107 in the Embodiment C

It is decided whether a quadric surface of the quadric surface query intersects (0,0,0)-(1,1,1) as the object MBB.

FIG. 10 shows a table storing procedure result according to the embodiment C.

C0 test (Step 1~8) and C1 test (Step 9~20) are same as the embodiments A and B. In these tests, any peaks and any edges do not intersect the quadric surface.

Next, in C2 test, intersection between a face and the quadric surface is decided.

In C2 test, by substituting an equation of a plane passing each face for the quadratic form, a minimum and a maximum of the quadratic form are checked. Because, peaks and edges of each face are not included in the quadratic form, and if any face intersects the quadric surface, a convex part of the quadric surface is included in a range of the face, and the minimum of the quadric surface is smaller than or equal to zero.

At Step 21, it is decided whether a face (0,0,0)-(1,0,0) of the MBB intersects the quadric surface. By substituting (x,y,z)=(0,v,w) for the quadratic form, an equation "$w^2-4*w/3+v^2+199/144$" is acquired. This quadric surface has the minimum at (v,w)=(0,2/3). This point is on the face of the MBB, and, in C1 test, each face does not intersect the quadric surface. Accordingly, this face does not intersect the quadric surface.

At Step 22, in the same way, no intersection is decided.

At Step 23, the quadric surface has the minimum at (v,w)=(2/3,2/3). This point is included in a range (0,0)~(1,1) of the face, and not both the peak and the edge. In order to calculate a minimum of the quadric surface, (v,w)=(2/3,2/3) is substituted for the equation. As a result, the value of the equation is −1/16 smaller than zero. This face intersects the quadric surface.

As a result, this MBB intersects the quadric surface.

This MBB is an MBB of the object. Accordingly, the collision decision unit 107 outputs an ID of the object.

Effect of the Embodiment C

For a set of objects, a partial set of objects which intersects the quadric surface as a retrieval range (indicated by the query) can be quickly acquired.

Figure 11:
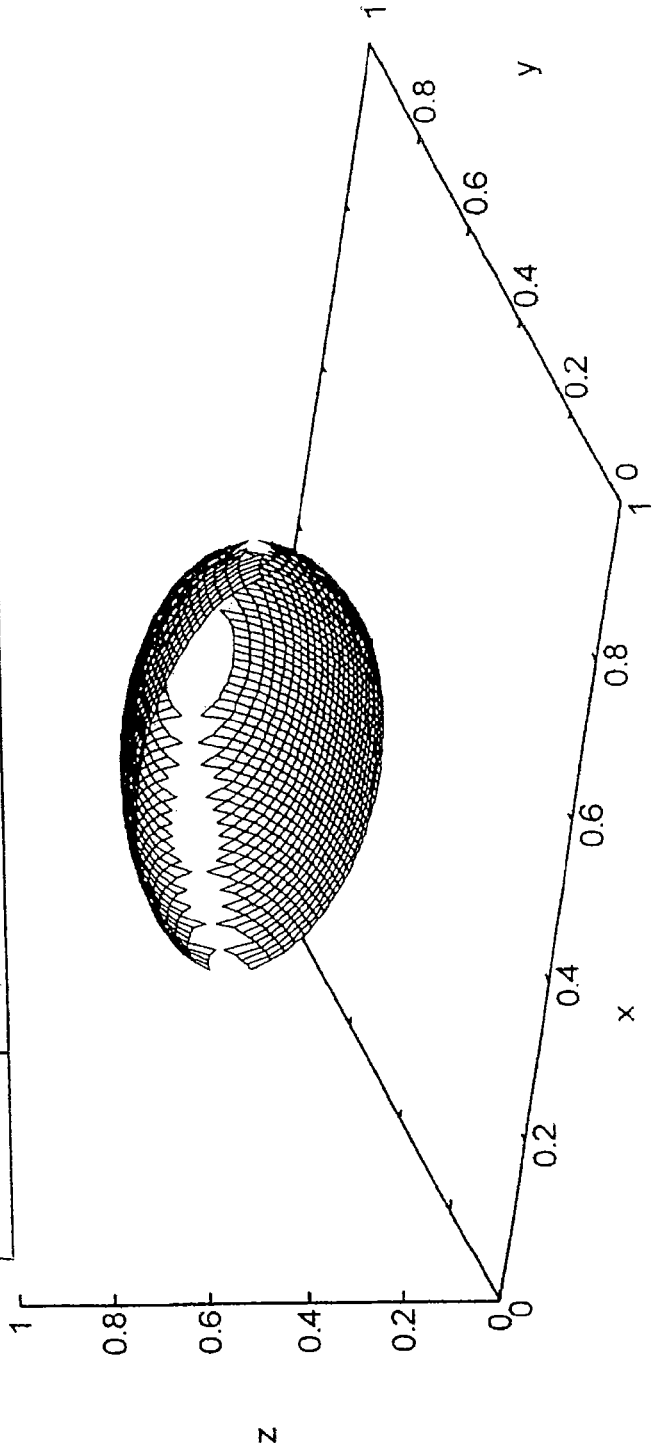
FIG. 11 is a collision decision result according to the embodiment C.

As shown in FIG. 11, this object actually intersects the query. Accordingly, this decision is correct.

The Embodiment D

In the present embodiment, only one unit cube exists as an object. As to the unit cube, some peak is (0,0,0) and an opposite peak thereto is (1,1,1). In this case, a quadric surface representing a sphere having a center (2/3,2/3,2/3) and a radius 1/4 is given as a query. Hereinafter, an example of operation of each unit is explained.

An equation of this query is represented as follows.

$$0 \geq z^2-4*z/3+y^2-4*y/3+x^2-4*x/3+61/48$$

Operation of the Object Hierarchical Structure Composition Unit 101 in the Embodiment D This operation is same as the embodiment A. Accordingly, explanation thereof is omitted.

Operation of the Object MBB Tree Storage Unit 102 in the Embodiment D

This operation is same as the embodiment A. Accordingly, explanation thereof is omitted.

Operation of the Vector Product Previous Calculation Unit 103 in the Embodiment D This operation is same as the embodiment A. Accordingly, explanation thereof is omitted.

Operation of the MBB Vector Product Cache Unit 104 in the Embodiment D

This operation is same as the embodiment A. Accordingly, explanation thereof is omitted.

Operation of the Quadric Surface MBB Calculation Unit 105 in the Embodiment D In the present embodiment, a quadric surface of the quadric surface query is a sphere. Accordingly, (5/12,5/12,5/12)-(11/12,11/12,11/12) is calculated as MBB.

Operation of the Initial Filtering Unit 106 in the Embodiment D

It is decided whether (5/12,5/12,5/12)-(11/12,11/12,11/12) as MBB of the quadric surface query intersects (0,0,0)-(1,1,1) as the object MBB.

As mentioned in the embodiment A, in order to decide intersection between two cuboids in parallel with x-axis, y-axis and z-axis, whether to have intersection along each axis is independently decided. When two cuboids have intersection along all axes, the two cuboids can be decided to intersect. Accordingly, this decision is simple in calculation amount.

First, as to x-axis, it is decided whether a range "0~1" of the object MBB intersects a range "5/12~11/12" of the quadric surface query MBB. In this case, a range "5/12~11/12" is intersected.

Next, as to y-axis, it is decided whether a range "0~1" of the object MBB intersects a range "5/12~11/12" of the quadric surface query MBB. In this case, a range "5/12~11/12" is intersected.

Next, as to z-axis, it is decided whether a range "0~1" of the object MBB intersects a range "5/12~11/12" of the quadric surface query MBB. In this case, a range "5/12~11/12" is intersected.

From mentioned-above, the quadric surface query MBB intersects the object MBB. Accordingly, this object ID is outputted to the collision decision unit 107.

Operation of the Collision Decision Unit 107 in the Embodiment D

It is decided whether a quadric surface of the quadric surface query intersects (0,0,0)-(1,1,1) as the object MBB.

FIG. 12 shows a table storing procedure result according to the embodiment C.

C0 test (Step 1~8), C1 test (Step 9~20) and C2 test (Step 21~26) are same as the embodiments A, B and C. In these tests, any peaks, any edges and any faces do not intersect the quadric surface.

Next, in C3 test, intersection between a body and the quadric surface is decided.

In C3 test, a minimum of the quadratic form is calculated, and it is decided whether the minimum is included in the MBB. Because, peaks, edges and faces of the body are not included in the quadratic form, and if the body intersects the quadric surface, the quadric surface is included in the MBB.

At Step 27, by substituting (x,y,z)=(u,v,w) for the quadratic form, an equation "$w^2-4*w/3+v^2-4*v/3+u^2-4*u/3+61/48$" is acquired. This quadric surface has the minimum at (u,v,w)=(2/3,2/3,2/3). This point is included in the MBB. In order to confirm that the quadric surface exists inside space of the MBB, by actually substituting (u,v,w)=(2/3,2/3,2/3) for the equation, a value thereof is $-1/16$ smaller than zero. Accordingly, the body intersects the quadric surface.

As a result, this MBB intersects the quadric surface.

This MBB is an MBB of the object. Accordingly, the collision decision unit 107 outputs an ID of the object.

Effect of the Embodiment D

For a set of objects, a partial set of objects which intersects the quadric surface as a retrieval range (indicated by the query) can be quickly acquired.

Figure 13:
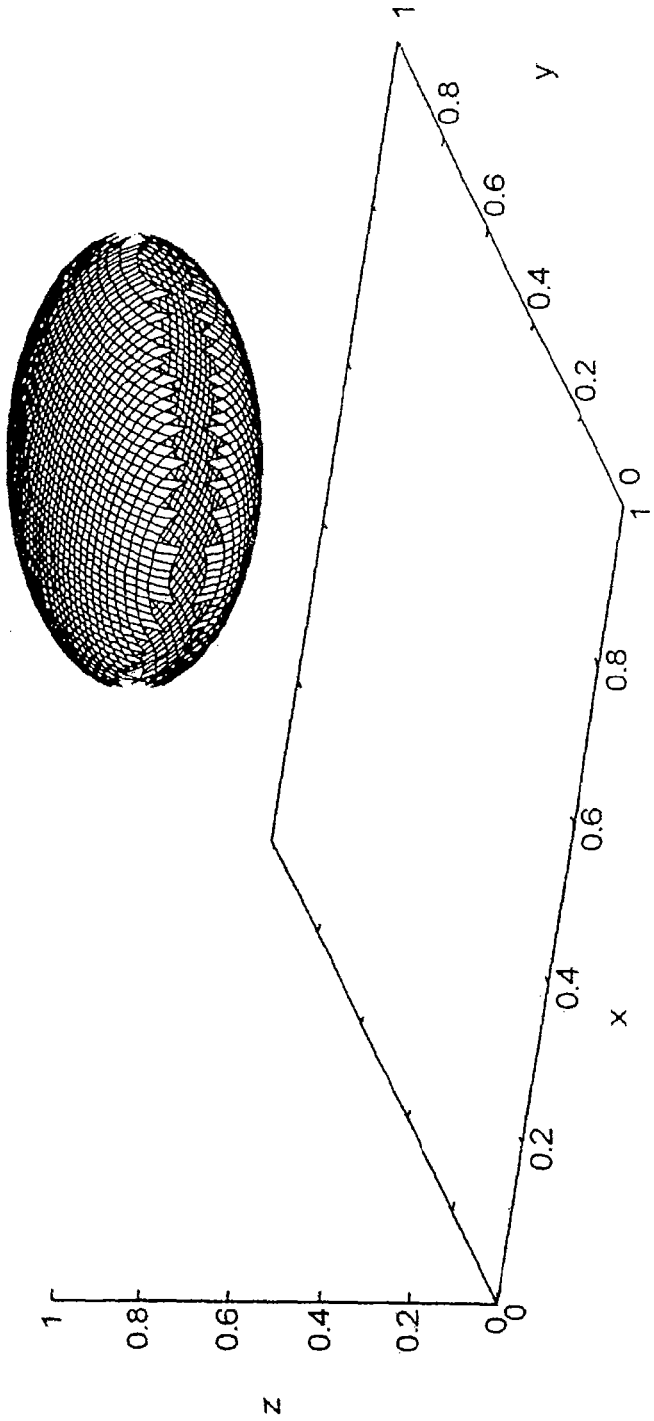
FIG. 13 is a collision decision result according to the embodiment D.

As shown in FIG. 13, this object actually intersects the query. Accordingly, this decision is correct.

The Embodiment E

In the present embodiment, only one unit cube exists as an object. As to the unit cube, some peak is (0,0,0) and an opposite peak thereto is (1,1,1). In this case, a quadric surface representing a sphere having a center (3/2,3/2,1/2) and a radius 1/4 is given as a query. Hereinafter, an example of operation of each unit is explained.

An equation of this query is represented as follows.

$$0 \geq z^2-z+y^2-3*y+x^2-3*x+75/16$$

Operation of the Object Hierarchical Structure Composition Unit 101 in the Embodiment E This operation is same as the embodiment A. Accordingly, explanation thereof is omitted.

Operation of the Object MBB Tree Storage Unit 102 in the Embodiment E

This operation is same as the embodiment A. Accordingly, explanation thereof is omitted.

Operation of the Vector Product Previous Calculation Unit 103 in the Embodiment E This operation is same as the embodiment A. Accordingly, explanation thereof is omitted.

Operation of the MBB Vector Product Cache Unit 104 in the Embodiment E

This operation is same as the embodiment A. Accordingly, explanation thereof is omitted.

Operation of the Quadric Surface MBB Calculation Unit 105 in the Embodiment E In the present embodiment, a quadric surface of the quadric surface query is a sphere. Accordingly, (5/4,5/4,1/4)-(7/4,7/4,3/4) is calculated as MBB.

Operation of the Initial Filtering Unit 106 in the Embodiment E

It is decided whether (5/4,5/4,1/4)-(7/4,7/4,3/4) as MBB of the quadric surface query intersects (0,0,0)-(1,1,1) as the object MBB.

As mentioned in the embodiment A, in order to decide intersection between two cuboids in parallel with x-axis, y-axis and z-axis, whether to have intersection along each axis is independently decided. When two cuboids have intersection along all axes, the two cuboids can be decided to intersect. Accordingly, this decision is simple in calculation amount.

First, as to x-axis, it is decided whether a range "0~1" of the object MBB intersects a range "5/4~7/4" of the quadric surface query MBB. In this case, these two ranges do not intersect.

Briefly, the quadric surface query MBB does not intersect the object MBB. Accordingly, an ID of this object is not outputted to the collision decision unit 107.

Operation of the Collision Decision Unit 107 in the Embodiment E

The initial filtering unit 106 does not output the ID of the object. Accordingly, the collision decision unit 107 does not operate.

However, even if the collision decision unit 107 operates, useless calculation only occurs, and operation as the present invention does not change. FIG. 14 shows a table storing the procedure if the collision decision unit 107 operates. Here, in C0 test, C2 test and C3 test, no intersection is decided. Accordingly, this object does not intersect the quadric surface.

Effect of the Embodiment E

For a set of objects, a partial set of objects which intersects the quadric surface as a retrieval range (indicated by the query) can be quickly acquired.

Figure 15:
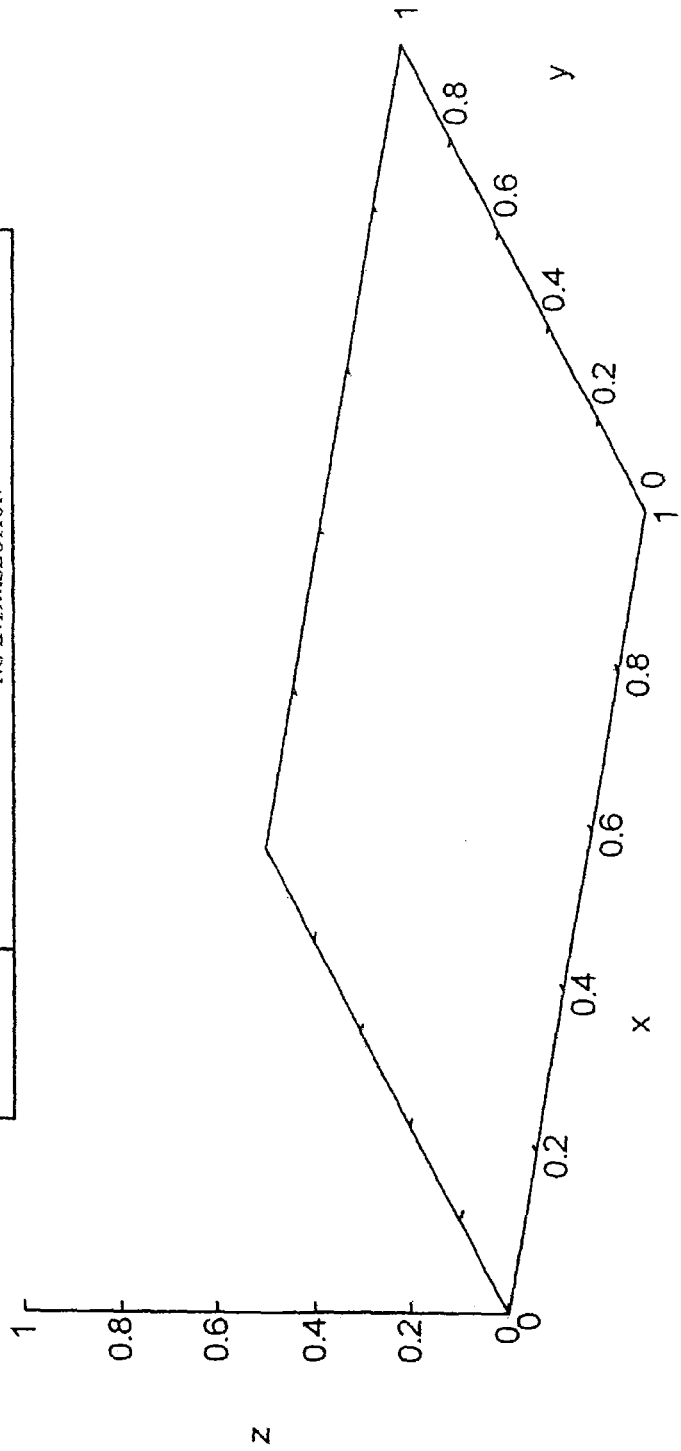
FIG. 15 is a collision decision result according to the embodiment E.

As shown in FIG. 15, this object does not actually intersect the query. Accordingly, this decision is correct.

The Embodiment F

In the present embodiment, only one unit cube exists as an object. As to the unit cube, some peak is (0,0,0) and an opposite peak thereto is (1,1,1). In this case, a quadric surface representing a sphere having a center (1,0,2/3) and a radius 1/4 is given as a query. Hereinafter, an example of operation of each unit is explained.

An equation of this query is represented as follows.

$$0 \geq z^2-4*z/3+y^2+x^2-2*x+199/144$$

Operation of the Object Hierarchical Structure Composition Unit 101 in the Embodiment F This operation is same as the embodiment A. Accordingly, explanation thereof is omitted.

Operation of the Object MBB Tree Storage Unit 102 in the Embodiment F

This operation is same as the embodiment A. Accordingly, explanation thereof is omitted.

Operation of the Vector Product Previous Calculation Unit 103 in the Embodiment F This operation is same as the embodiment A. Accordingly, explanation thereof is omitted.

Operation of the MBB Vector Product Cache Unit 104 in the Embodiment F

This operation is same as the embodiment A. Accordingly, explanation thereof is omitted.

Operation of the Quadric Surface MBB Calculation Unit 105 in the Embodiment F In the present embodiment, a quadric surface of the quadric surface query is a sphere. Accordingly, (3/4,3/4,5/12)-(5/4,5/4,11/12) is calculated as MBB.

Operation of the Initial Filtering Unit 106 in the Embodiment F

It is decided whether (3/4,3/4,5/12)-(5/4,5/4,11/12) as MBB of the quadric surface query intersects (0,0,0)-(1,1,1) as the object MBB.

As mentioned in the embodiment A, in order to decide intersection between two cuboids in parallel with x-axis, y-axis and z-axis, whether to have intersection along each axis is independently decided. When two cuboids have intersection along all axes, the two cuboids can be decided to intersect. Accordingly, this decision is simple in calculation amount.

First, as to x-axis, it is decided whether a range "0~1" of the object MBB intersects a range "3/4~5/4" of the quadric surface query MBB. In this case, a range "3/4~1" is intersected.

Next, as to y-axis, it is decided whether a range "0~1" of the object MBB intersects a range "3/4~5/4" of the quadric surface query MBB. In this case, a range "3/4~1" is intersected.

Next, as to z-axis, it is decided whether a range "0~1" of the object MBB intersects a range "5/12~11/12" of the quadric surface query MBB. In this case, a range "5/12~11/12" is intersected.

From mentioned-above, the quadric surface query MBB intersects the object MBB. Accordingly, this object ID is outputted to the collision decision unit 107.

Operation of the Collision Decision Unit 107 in the Embodiment F

It is decided whether a quadric surface of the quadric surface query intersects (0,0,0)-(1,1,1) as the object MBB.

In the embodiment F, according to the flow chart of FIG. 3, Step 1~Step 27 of C0 test~C3 test are executed in parallel. At timing when intersection is decided at any Step, intersection is decided. When no intersection is decided at all Steps, no intersection is decided.

Here, irrespective of execution order, intersection is decided at Step 19. Accordingly, the collision decision unit 107 decides that this MBB intersects the quadric surface.

This MBB is an MBB of the object. Accordingly, the collision decision unit 107 outputs an ID of the object.

Effect of the Embodiment F

For a set of objects, a partial set of objects which intersects the quadric surface as a retrieval range (indicated by the query) can be quickly acquired.

As shown in FIG. 9, this object actually intersects the query. Accordingly, this decision is correct.

The Embodiment G

In the embodiment G, following three cubes are used as the object.
1. (0,0,0)-(1,1,1)
2. (10,0,0)-(11,1,1)
3. (20,0,0)-(21,1,1)

Furthermore, a quadric surface representing a sphere having a center (1,0,2/3) and a radius 1/4 is given as a query. Hereinafter, an example of operation of each unit is explained.

An equation of this query is represented as follows.

$$0 \geq z^2 - 4 \cdot z/3 + y^2 + x^2 - 2 \cdot x + 199/144$$

Operation of the Object Hierarchical Structure Composition Unit 101 in the Embodiment G Three cubes are accepted, and an MBB of each cube is calculated. In this case, the MBB is same as an original cube.

Figure 16:
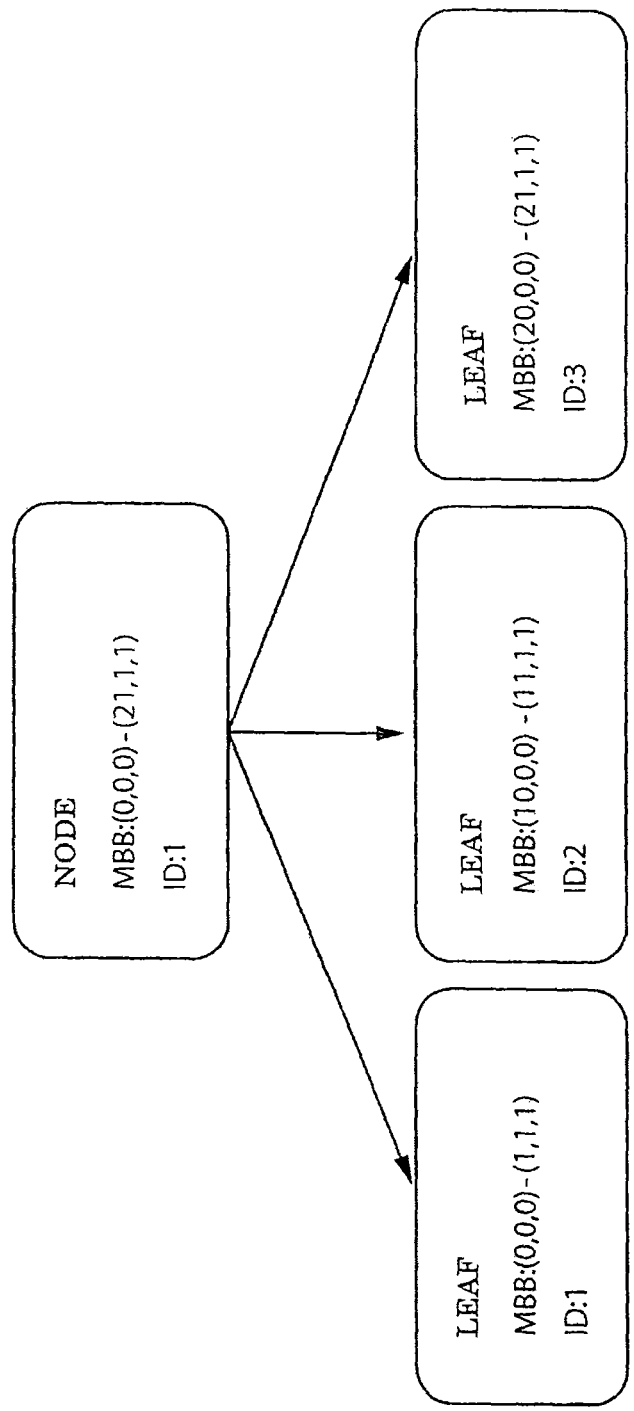
FIG. 16 is an example of a tree having three leaves.

In the embodiment G, a tree in which child nodes (linked from the same parent node) are above three objects is composed. Concretely, as shown in FIG. 16, a tree having three leaves is composed.

Operation of the Object MBB Tree Storage Unit 102 in the Embodiment G

The tree having three leaves (FIG. 16) composed by the object hierarchical structure composition unit 101 is stored.

Operation of the Vector Product Previous Calculation Unit 103 in the Embodiment G As to each MBB, above-mentioned vector product (a set of values of vector products) is respectively calculated.

Operation of the MBB Vector Product Cache Unit 104 in the Embodiment G

As shown in FIG. 17, the vector product calculated by the vector product previous calculation unit 103 is stored as a table format.

Operation of the Quadric Surface MBB Calculation Unit 105 in the Embodiment G In the embodiment G, a quadric surface of the quadric surface query is a sphere. Accordingly, (3/4,3/4,3/4)-(5/4,5/4,5/4) is calculated as MBB.

Operation of the Initial Filtering Unit 106 in the Embodiment G

As for each object, intersection decision is executed in parallel.

Briefly, intersection decision between an object 1 and the quadric surface, intersection decision between an object 2 and the quadric surface, intersection decision between an object 3 and the quadric surface, are executed in parallel.

The intersection decision between the object 1 and the quadric surface is same as that in the embodiment B.

The intersection decision between the object 2 and the quadric surface is intersection decision between (10,0,0)-(11,1,1) as the object 2 and (3/4,3/4,3/4)-(5/4,5/4,5/4) as the quadric surface query MBB. In this decision, as to x-axis, it is decided whether a range "10~11" of the object 2 intersects a range "3/4~5/4" of the quadric surface query MBB. Here, these two ranges do not intersect. Accordingly, the initial filtering unit 106 does not output the object 2 to the collision decision unit 107.

The intersection decision between the object 3 and the quadric surface is intersection decision between (20,0,0)-(21,1,1) as the object 3 and (3/4,3/4,3/4)-(5/4,5/4,5/4) as the quadric surface query MBB. In this decision, as to x-axis, it is decided whether a range "20~21" of the object 3 intersects a range "3/4~5/4" of the quadric surface query MBB. Here, these two ranges do not intersect. Accordingly, the initial filtering unit 106 does not output the object 3 to the collision decision unit 107.

From mentioned-above, an object intersecting the quadric surface query MBB is the object 1 only. Accordingly, the object 1 is outputted. This output processing is operated among objects in parallel.

Operation of the Collision Decision Unit 107 in the Embodiment G

The initial filtering unit 106 outputs the object 1 only. Accordingly, this operation is same as that of the embodiment B.

Effect of the Embodiment G

For a set of objects, a partial set of objects which intersects the quadric surface as a retrieval range (indicated by the query) can be quickly acquired.

As shown in FIG. 9, this object actually intersects the query. Accordingly, this decision is correct.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operating system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for deciding intersection between a quadric surface and an N-dimensional cuboid in N-dimensional space (N being an integral number larger than or equal to three), comprising:
a query acceptance unit configured to accept a retrieval query indicating the quadric surface in the N-dimensional space; and
a collision decision unit configured to decide whether the quadric surface intersects the N-dimensional cuboid positioned in the N-dimensional space,
wherein the collision decision unit has a plurality of decision functions including zero-th to (N−1)-th decision functions to decide whether at least a part of at least one of an X-dimensional face (X is all integral numbers larger than or equal to zero, and smaller than or equal to (N−1)) of the N-dimensional cuboid is included in the quadric surface, and decides by using the plurality of decision functions.

2. The apparatus according to claim 1, wherein
the plurality of decision functions includes an N-th decision function to decide whether the quadric surface is included in the N-dimensional cuboid.

3. The apparatus according to claim 1, wherein
the collision decision unit executes the plurality of decision functions from the zero-th decision function in order of smaller number, and, when a decision of intersection is acquired at one of the plurality of decision functions, omits execution of the plurality of decision functions having numbers larger than the one.

4. The apparatus according to claim 1, wherein
the collision decision unit executes the plurality of decision functions in parallel, and, when a decision of intersection is acquired at one of the plurality of decision functions, omits execution of the plurality of decision functions except for the one.

5. The apparatus according to claim 1, wherein
the collision decision unit decides whether the quadric surface intersects each of a plurality of N-dimensional cuboids positioned in the N-dimensional space, in parallel.

6. The apparatus according to claim 1, further comprising:
a calculation unit configured to calculate a minimum bounded box of the quadric surface; and an initial filtering unit configured to decide whether the minimum bounded box intersects the N-dimensional cuboid, wherein, when the initial filtering unit decides that the minimum bounded box intersects the N-dimensional cuboid, the collision decision unit regards the N-dimensional cuboid as a target to decide intersection.

7. The apparatus according to claim 1, wherein the N-dimensional cuboid is a minimum bounded box of an object positioned in the N-dimensional space.

8. An apparatus for deciding intersection between a quadric surface and a cuboid in three-dimensional space, comprising:
a query acceptance unit configured to accept a retrieval query indicating the quadric surface in the three-dimensional space; and
a collision decision unit configured to decide whether the quadric surface intersects the cuboid positioned in the three-dimensional space,
wherein the collision decision unit has a plurality of decision functions including
a zero-th decision function to decide whether at least one of peaks of the cuboid is included in the quadric surface,
a first decision function to decide whether at least a part of at least one of edges of the cuboid is included in the quadric surface, and
a second decision function to decide whether at least a part of at least one of faces of the cuboid is included in the quadric surface,
and decides by using the plurality of decision functions.

9. The apparatus according to claim 8, wherein the plurality of decision functions includes a third decision function to decide whether the quadric surface is included in the cuboid.

10. The apparatus according to claim 8, wherein the collision decision unit executes the plurality of decision functions from the zero-th decision function in order of smaller number, and, when a decision of intersection is acquired at one of the plurality of decision functions, omits execution of the plurality of decision functions having numbers larger than the one.

11. The apparatus according to claim 8, wherein the collision decision unit executes the plurality of decision functions in parallel, and, when a decision of intersection is acquired at one of the plurality of decision functions, omits execution of the plurality of decision functions except for the one.

12. The apparatus according to claim 8, wherein the collision decision unit decides whether the quadric surface intersects each of a plurality of cuboids positioned in the three-dimensional space, in parallel.

13. The apparatus according to claim 8, further comprising:
a calculation unit configured to calculate a minimum bounded box of the quadric surface; and
an initial filtering unit configured to decide whether the minimum bounded box intersects the cuboid;
wherein, when the initial filtering unit decides that the minimum bounded box intersects the cuboid, the collision decision unit regards the cuboid as a target to decide intersection.

14. The apparatus according to claim 8, wherein the cuboid is a minimum bounded box of an object positioned in the three-dimensional space.

15. A method for deciding intersection between a quadric surface and an N-dimensional cuboid in N-dimensional space (N being an integral number larger than or equal to three), comprising:
accepting a retrieval query indicating the quadric surface in the N-dimensional space; and
deciding whether the quadric surface intersects the N-dimensional cuboid positioned in the N-dimensional space,
wherein the deciding includes
deciding by using a plurality of decision functions including zero-th to (N−1)-th decision functions to decide whether at least a part of at least one of an X-dimensional face (X is all integral numbers larger than or equal to zero, and smaller than or equal to (N−1)) of the N-dimensional cuboid is included in the quadric surface.

16. An apparatus for deciding intersection between a quadric surface and a photovoltaic power generation panel, comprising:
a query acceptance unit configured to accept a retrieval query indicating the quadric surface in a three-dimensional space, the quadric surface representing an area by a shadow or a reflected light of a predetermined object; and
a collision decision unit configured to decide whether the quadric surface intersects a minimum bounded box surrounding the photovoltaic power generation panel or the object positioned in the three-dimensional space,
wherein the collision decision unit has a plurality of decision functions including
a zero-th decision function to decide whether at least one of peaks of the minimum bounded box is included in the quadric surface,
a first decision function to decide whether at least a part of at least one of edges of the minimum bounded box is included in the quadric surface, and
a second decision function to decide whether at least a part of at least one of faces of the minimum bounded box is included in the quadric surface,
and decides by using the plurality of decision functions.

17. The apparatus according to claim 16, wherein the plurality of decision functions includes a third decision function to decide whether the quadric surface is included in the minimum bounded box.

18. The apparatus according to claim 16, wherein the collision decision unit executes the plurality of decision functions from the zero-th decision function in order of smaller number, and, when a decision of intersection is acquired at one of the plurality of decision functions, omits execution of the plurality of decision functions having numbers larger than the one.

19. The apparatus according to claim 16, wherein the collision decision unit executes the plurality of decision functions in parallel, and, when a decision of intersection is acquired at one of the plurality of decision functions, omits execution of the plurality of decision functions except for the one.

20. The apparatus according to claim 16, wherein the collision decision unit decides whether the quadric surface intersects each of a plurality of minimum bounded boxes positioned in the three-dimensional space, in parallel.

21. The apparatus according to claim 16, further comprising:
a calculation unit configured to calculate a new minimum bounded box of the quadric surface; and an initial filtering unit configured to decide whether the new minimum bounded box intersects the minimum bounded box;

wherein, when the initial filtering unit decides that the new minimum bounded box intersects the minimum bounded box, the collision decision unit regards the minimum bounded box as a target to decide intersection.

* * * * *